Patented Apr. 27, 1954

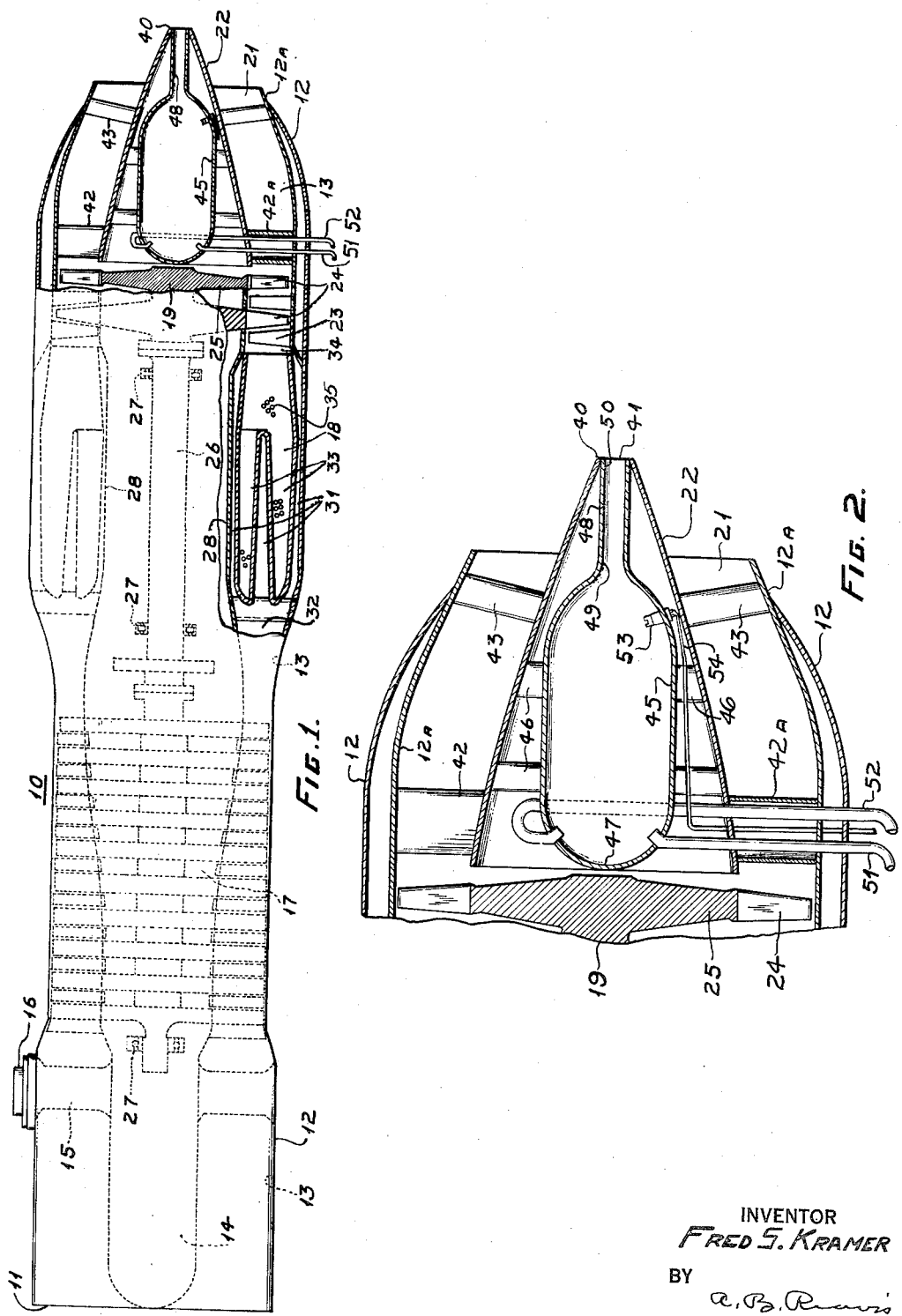

2,676,457

UNITED STATES PATENT OFFICE 2,676,457

COMBINED ROCKET AND JET PROPULSION

Fred S. Kramer, Prospect Park, Pa., assignor, by mesne assignments, to the United States of America as represented by the Secretary of the Navy Application November 9, 1945, Serial No. 627,639

2 Claims. (Cl. 60—35.6)

This invention relates to power plants, particularly to gas turbine power plants, and has for an object to provide improved apparatus of this character.

The present invention, although not limited thereto, is particularly adapted for use with a gas turbine power plant of the type employed on aircraft to drive the propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and turbine for heating the compressed air and which discharges the hot gases at a suitable temperature and pressure to the turbine. The spent gases on leaving the turbine are discharged through a nozzle provided at the rear of the casing and may aid in propelling the aircraft.

Another object of the invention is to provide, in the tail cone of the jet propulsion power plant for aircraft, a rocket power plant adapted to assist or to take the place of the gas turbine jet propulsion feature of the apparatus.

Another object of the invention is to provide, in a gas turbine power plant having an annular jet nozzle whose inner wall is defined by a conical tailpiece, a rocket power plant positioned within the conical tailpiece, in what would otherwise be waste space, with the rocket unit so arranged as to discharge its jet through an opening provided at the apex of the conical tailpiece.

These and other objects are effected by the invention as will be apparent from the following description and claims taken in connection with the accompanying drawing, forming a part of this application, in which:

Fig. 1 is a side elevational view of a gas turbine power plant incorporating the features of the present invention, a portion of the outer casing and part of the inner structure being broken away to better illustrate the novel features; and Fig. 2 is an enlarged sectional view of the structure shown at the right-hand end of Fig. 1.

The power plant shown in Fig. 1, and generally indicated 10, is adapted to be mounted in or on the fuselage or wing of an airplane with the left or intake end 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 15 with auxiliaries 16, an axial-flow compressor 17, combustion apparatus generally indicated 18, a turbine 19 which drives the compressor, and a nozzle 21 defined by the casing 12a and by a tailpiece 22, the latter being mounted concentrically in the casing and cooperating with the latter to provide the propulsion nozzle.

Air enters at the intake end 11 and flows substantially straight through the plant, passing through the compressor 17, where it is compressed, and into the combustion apparatus 18, where it is heated. The hot gases, comprising the products of combustion and excess air heated by the combustion, on leaving the combustion apparatus are directed by suitable guide vanes or nozzles 23 against the blades 24 of the turbine disc 25 and then are discharged through the propulsion nozzle 21 to propel the aircraft.

The present invention is not limited to the specific details or arrangement of the structure thus far described, but it is primarily concerned with the tailpiece or tail cone 22 and the rocket unit positioned therein.

By reference to Fig. 1, it will be noted that the compressor and turbine rotors are interconnected by means of a shaft 26 supported in suitable bearings, indicated at 27, and enclosed by an inner casing structure, generally indicated 28, which protects the shaft and bearings from high temperatures and also defines a portion of the annular air flow passage 13 in which the combustion apparatus 18 is mounted.

In order to maintain the combustion apparatus and the outer casing structure of small maximum diameter, the combustion apparatus is divided by wall structure into an air space or spaces 31 open to the discharge end of a diffuser passage 32 leading from the compressor, and which overlap a burner space or spaces 33 open to a passage 34 leading to the turbine guide vanes 23. Atomized fuel is supplied to the forward end of the burner space or spaces which are also provided with ignition means. The dividing wall structure has openings 35 therein to provide for entry into the burner space of compressed air from the overlapping air spaces, the entering air supporting combustion of fuel and mixing with the hot products of combustion to provide a motive fluid comprising a mixture of air and products of combustion of suitable temperature for driving the turbine.

In gas turbine power plants of the type herein described, and regardless of whether the propelling action is applied through a propeller or through a jet, or a combination of the two, it may be desirable to augment the propelling action by a rocket jet action or to substitute such jet action for the normal propelling means of the power plant. As previously pointed out herein, it is desirable that a plant of this type, particularly when used for aircraft propulsion, be streamlined to the greatest possible degree and of minimum frontal area to reduce, in so far as possible, the drag effect during flight.

The present invention seeks to so locate the rocket propulsion unit that no increase in frontal area of the complete power plant results and, to this end, it is proposed to locate the rocket propulsion unit in the space already available within the hollow conical tailpiece 22, the rocket fuel chamber being connected to an opening in the apex of the conical tailpiece by the usual slightly flared rocket nozzle with the result that the jet stream issuing from the rocket nozzle joins with the jet propulsion stream from the gas turbine power plant if the latter is in operation or, if not, is directed rearwardly at the same location that the gas turbine exhaust gas stream would normally issue.

Referring now to the details of construction illustrated in Fig. 2, the conical tailpiece or tail cone 22 is provided at its apex 40 with an opening 41 for a purpose to be hereinafter described. The tail cone is supported from the inner casing 12a by radially-extending struts 42 and 43, one of the struts 42, that indicated 42a, being hollow for the passage therethrough of fuel conduits in the manner hereinafter described.

Within the hollow tail cone 22 is positioned a rocket fuel chamber 45 supported by struts 46 extending radially therefrom to the tail cone 22. Preferably, the side walls of the rocket fuel chamber 45 are cylindrical, the forward end of the chamber being closed by a semi-spherical or domed wall 47, and the rearward end of the chamber having an exhaust nozzle 48 which tapers from its throat portion 49 to its discharge end 50 which connects with the apex opening 41 of the conical tailpiece, whereby the propulsive force of the jet issuing therefrom is increased, in the manner familiar to those skilled in the art.

If the rocket is to be of the liquid fuel type, such fuel and liquid oxygen or other chemicals necessary for the operation thereof may be supplied thereto by conduits 51 and 52 leading from any suitable source to the forward end of the rocket chamber and passing through the hollow strut 42a, whereby the conduits are protected from the hot gases discharging from the gas turbine 19. Suitable means, as illustrated at 53, may be provided within the fuel chamber for igniting the fuel mixture and, where this ignition means is of an electrical nature as herein illustrated, the wires 54 therefor may likewise pass through the hollow strut 42a.

It will be apparent that applicant's contribution is not limited to a rocket unit of the liquid fuel type, but may be equally applicable to rocket units of the dry fuel type, and in which case the conduits 51 and 52 may be omitted.

While the invention has been shown in but one form, it will be obvious to those skilled in the art that it is not so limited, but is susceptible of various changes and modifications without departing from the spirit thereof.

What is claimed is:

1. In a gas turbine power plant comprising an air compressor, combustion apparatus for heating air compressed by said compressor, a gas turbine for extracting from the heated air sufficient power to drive said compressor, and an annular nozzle axially aligned with said turbine for discharge of said heated air in the propelling jet; a hollow tail cone having its base positioned behind said turbine in axial alignment therewith with the altitude thereof extending axially of the power plant terminating adjacent the outlet of the nozzle, said tail cone defining the inner wall of said annular nozzle, said tail cone having an aperture in the apex end thereof, a rocket fuel combustion chamber, means mounting said chamber within said tail cone, and nozzle means on one end of said rocket fuel combustion chamber for discharging the burned gases through said tail cone aperture.

2. In a gas turbine power plant comprising an air compressor, combustion apparatus for heating air compressed by said compressor, a gas turbine for extracting from the heated air sufficient power to drive said compressor, and an annular nozzle axially aligned with said turbine for discharge of said heated air in the propelling jet; a hollow tail cone having its base positioned behind said turbine in axial alignment therewith with the altitude thereof extending axially of the power plant terminating adjacent the outlet of the nozzle, said tail cone defining the inner wall of said annular nozzle, said tail cone having an aperture in the apex end thereof, radial strut means supporting said tail cone, one of said struts being hollow, a rocket fuel combustion chamber, means mounting said chamber within said tail cone, fuel conduit means mounted in said hollow strut for conducting fuel to said rocket fuel chamber, and nozzles means on one end of said rocket fuel combustion chamber for discharging the burned gases through said tail cone aperture.

References Cited in the file of this patent

UNITED STATES PATENTS

| Number | Name | Date |
|---|---|---|
| 2,326,072 | Seippel | Aug. 3, 1943 |
| 2,404,334 | Whittle | July 16, 1946 |
| 2,404,428 | Bradbury | July 23, 1946 |
| 2,411,552 | New | Nov. 26, 1946 |
| 2,419,866 | Wilson | Apr. 29, 1947 |